(12) United States Patent
Kabaya

(10) Patent No.: US 12,539,165 B2
(45) Date of Patent: Feb. 3, 2026

(54) APPARATUS AND METHOD FOR ELECTROSURGERY

(71) Applicant: OLYMPUS MEDICAL SYSTEMS CORP., Tokyo (JP)

(72) Inventor: Akinori Kabaya, Hino (JP)

(73) Assignee: Olympus Medical Systems Corp., Tokyo (JP)

( * ) Notice: Subject to any disclaimer, the term of this patent is extended or adjusted under 35 U.S.C. 154(b) by 1033 days.

(21) Appl. No.: 17/536,240

(22) Filed: Nov. 29, 2021

(65) Prior Publication Data

US 2022/0280224 A1 Sep. 8, 2022

Related U.S. Application Data

(60) Provisional application No. 63/155,808, filed on Mar. 3, 2021.

(51) Int. Cl.
*A61B 18/14* (2006.01)
*A61B 18/00* (2006.01)

(52) U.S. Cl.
CPC ...... *A61B 18/1445* (2013.01); *A61B 2018/00601* (2013.01); *A61B 2018/00607* (2013.01);
(Continued)

(58) Field of Classification Search
CPC ........... A61B 2018/00779; A61B 2018/00791; A61B 2018/00797; A61B 2018/00886;
(Continued)

(56) References Cited

U.S. PATENT DOCUMENTS 6,106,524 A * 8/2000 Eggers ................ A61B 5/0531
606/41
8,932,282 B2 1/2015 Gilbert
(Continued)

FOREIGN PATENT DOCUMENTS

CN 101883534 A 11/2010
JP 2001-157685 A 6/2001
(Continued)

OTHER PUBLICATIONS

Office Action dated Feb. 14, 2023, issued in corresponding Japanese Patent Application No. 2022-008868.
(Continued)

*Primary Examiner* — Tigist S Demie
(74) *Attorney, Agent, or Firm* — Morgan, Lewis & Bockius LLP

(57) ABSTRACT

Methods and systems for treating biological tissue using high frequency electrical energy includes a cycle comprising a desiccating phase, a cutting phase and a coagulating phase. During the desiccating phase of the cycle, a first high frequency electrical energy applied to the tissue for desiccating the tissue is modulated. A first parameter associated with application of the first high frequency electrical energy to the tissue for desiccating the tissue is estimated. During the cutting phase, cutting energy applied to the tissue for cutting the tissue is then modulated based on the first parameter. During the coagulating phase, a second high frequency electrical energy applied to the tissue for coagulating the cut tissue is modulated.

18 Claims, 7 Drawing Sheets

(52) U.S. Cl.
 CPC ............... *A61B 2018/00702* (2013.01); *A61B 2018/00726* (2013.01); *A61B 2018/00732* (2013.01); *A61B 2018/00767* (2013.01)

(58) Field of Classification Search
 CPC ...... A61B 2018/126; A61B 2018/1467; A61B 18/00; A61B 18/08; A61B 18/082; A61B 18/12; A61B 18/1233; A61B 2018/00589; A61B 2018/1253
 See application file for complete search history.

(56) References Cited

U.S. PATENT DOCUMENTS

| 9,980,768 | B2 | 5/2018 | Werner | |
|---|---|---|---|---|
| 2002/0091385 | A1* | 7/2002 | Paton | A61B 18/1442 606/51 |
| 2010/0030212 | A1 | 2/2010 | Aramayo | |
| 2011/0028963 | A1* | 2/2011 | Gilbert | A61B 18/1206 606/41 |
| 2012/0271304 | A1 | 10/2012 | Werner | |
| 2020/0155220 | A1 | 5/2020 | Pope et al. | |
| 2020/0188014 | A1* | 6/2020 | Woloszko | A61B 18/16 |

FOREIGN PATENT DOCUMENTS

| JP | 2001-178739 A | 7/2001 |
|---|---|---|
| JP | 2001-231791 A | 8/2001 |
| JP | 2011-031048 A | 2/2011 |
| JP | 2012-223585 A | 11/2012 |
| JP | 2022-507298 A | 1/2022 |
| WO | 2020/101954 A1 | 5/2020 |

OTHER PUBLICATIONS

Office Action dated Mar. 12, 2025, issued in corresponding Chinese Patent Application No. 202210162867.1.

* cited by examiner

APPARATUS AND METHOD FOR ELECTROSURGERY

RELATED APPLICATION DATA

This application is based on and claims priority under 35 U.S.C. § 119 to U.S. Provisional Application No. 63/155,808 filed on Mar. 3, 2021, the entire contents of which are incorporated herein by reference.

TECHNICAL FIELD

The systems, devices and methods disclosed herein are directed to electrosurgery and in particular to cutting of a biological tissue using high frequency electrical energy.

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

Many medical procedures include cutting a biological tissue such as, for example, when making incision or excising mucosa or submucosa. One of the techniques used for cutting biological tissue involves use of high frequency electrical energy to first dry or desiccate tissue by heating the tissue with a high frequency electric current and then cut the dried/desiccated tissue by generating an arc discharge between the tissue and an end-effector of the medical device. The cut tissue is then coagulated or sealed by providing additional high frequency electrical energy to stop bleeding following the cut.

When a high frequency electric power is applied impedance of the tissue increases as the tissue is dried/desiccated. The increased impedance causes a rise in the potential across the tissue and when the potential across the tissue reaches a breakdown voltage, a discharge is produced, which cuts the tissue. When the arc discharge is being produced, the high frequency voltage across the tissue is low, but the current is high and flows through a narrow path depending on the contact area between the end-effector and the tissue. Moreover, when the arc discharge occurs, DC voltage is generated across the tissue by rectifying action. The high current density caused by the high current through a small area generates heat that cuts the tissue open.

End-effectors with different shapes and sizes have been used in medical devices for cutting biological tissue depending on the type and location of tissue on which the procedure is performed. The difference in shapes and sizes of end-effectors causes undesirable variance in the performance of the medical device. Improved control mechanisms for controlling the power supplied to the end-effectors during an electrosurgical cutting procedure are therefore, desired.

SUMMARY

To address the above-noted issues in high frequency cutting of biological tissues, improved techniques are needed to reduce the variance in performance of the medical devices for different types of end-effectors. In one aspect, the variance in performance can be reduced by adjusting the parameters associated with the application of high frequency electrical energy to the biological tissue based on the area of contact between the end-effector and the tissue being cut. In another aspect, the contact area between the end-effector and the tissue could be estimated during the process of drying or desiccating the tissue and such a contact area determined in-process can be used as a basis for adjustment of the parameters associated with the application of high frequency electrical energy to the biological tissue.

For example, when a high frequency energy is applied to the tissue, the tissue dries or desiccates and the impedance of the tissue increases. This increase in impedance leads to an increase in the potential across the tissue. The rate of increase in the impedance, and thus, the rate of increase in the potential across the tissue, is dependent on the contact area between the end-effector and the tissue. Thus, by measuring the time needed for the potential across the tissue to reach a certain threshold, the contact area between the tissue and the end-effector can be estimated. Parameters for controlling the high frequency electrical energy applied to the tissue can thus be estimated based on the time taken for the potential across the tissue to reach a predetermined threshold.

Advantageously, controlling the electrical energy applied to the tissue during a tissue cutting procedure based on a contact area between the end-effector and the tissue can reduce the variance in performance depending on the end-effectors.

Accordingly, a method for treating a biological tissue using high frequency electrical energy disclosed herein uses a first parameter estimated during desiccating the tissue to modulate the energy supplied to the tissue during the cutting of the tissue.

In one aspect of the present disclosure, a method for treating a biological tissue using high frequency electrical energy includes (a) modulating a high frequency energy applied to the tissue for desiccating the tissue; (b) estimating a first parameter during the application of the high frequency energy to the tissue for desiccating the tissue; and (c) modulating a cutting energy applied to the tissue for cutting the tissue based on the first parameter.

In some embodiments, the method further comprises: (d) modulating a second high frequency electrical energy applied to the tissue to coagulate the tissue cut in (c).

In some embodiments, the method further comprises performing (a)-(d) sequentially for a first cycle and repeating (a)-(d) sequentially for a second cycle for treating the tissue.

In some embodiments, modulating the cutting energy in the second cycle is based on the first parameter estimated during the first cycle.

In some embodiments, the method further comprises estimating a second parameter during (d).

In some embodiments, modulating the cutting energy in the second cycle is based on the first and second parameters estimated during the first cycle.

In some embodiments, the second parameter comprises high frequency power output during (d).

In some embodiments, the method further comprises repeating the second cycle, wherein modulating the cutting energy is based on the first and second parameters estimated during an immediately preceding second cycle.

In some embodiments, the method further comprises repeating the second cycle, wherein modulating the cutting energy is based on the second parameter estimated during an immediately preceding second cycle and on the first parameter estimated during the first cycle.

In some embodiments, the first parameter comprises a time for a DC component of voltage across the tissue during (a) to reach a first threshold value.

In some embodiments, modulating the cutting energy comprises estimating a contact area between the tissue and an end effector of the medical device based on the first parameter, and changing a cutting energy parameter associated with application of the cutting energy based on the contact area.

In some embodiments, the cutting energy parameter comprises an amount of time for which a cutting voltage is applied to the tissue, and wherein modulating the cutting energy comprises increasing the amount of time for which the cutting voltage is applied if the contact area exceeds an area threshold.

In some embodiments, the cutting energy parameter comprises a DC component of voltage across the tissue, and wherein modulating the cutting energy comprises increasing the cutting voltage if the contact area exceeds an area threshold.

In some embodiments, the cutting energy parameter comprises a value the cutting voltage applied to the tissue, and wherein modulating the cutting energy comprises increasing the value of cutting voltage if the contact area exceeds an area threshold.

In an aspect the present disclosure describes a controller for a medical device configured to treat the tissue using high frequency electrical energy. The controller is operably coupled to a power source of the medical device and is configured to: (a) control the power source to modulate a first high frequency energy applied to the tissue for desiccating the tissue; (b) estimate a first parameter during (a); and (c) control the power source to modulate a cutting energy applied to the tissue for cutting the tissue based on the first parameter.

In some embodiments, the controller is further configured to: (d) control the power source to modulate a second high frequency energy applied to the tissue to coagulate the tissue cut in (c).

In some embodiments, the controller is further configured to perform (a)-(d) sequentially for a first cycle and repeating (a)-(d) sequentially for a second cycle for treating the tissue.

In some embodiments, the controller is configured to modulate the cutting energy in the second cycle based on the first parameter estimated during the first cycle.

In some embodiments, further configured to estimate a second parameter during (d).

In some embodiments, the controller is configured to modulate the cutting energy in the second cycle based on the first and second parameters estimated during the first cycle.

In some embodiments, the second parameter comprises high frequency power output during (d).

In some embodiments, the controller is further configured to repeat the second cycle, wherein modulating the cutting energy is based on the first and second parameters estimated during an immediately preceding second cycle.

In some embodiments, the controller is further configured to repeat the second cycle, wherein modulating the cutting energy is based on the second parameter estimated during an immediately preceding second cycle and on the first parameter estimated during the first cycle.

In some embodiments, the first parameter comprises a time for a DC component of voltage across the tissue during (a) to reach a first threshold value.

In some embodiments, the controller is configured to modulate the cutting energy by estimating a contact area between the tissue and an end effector of the medical device based on the first parameter, and changing a cutting energy parameter associated with application of the cutting energy based on the contact area.

In some embodiments, the cutting energy parameter comprises an amount of time for which a cutting voltage is applied to the tissue, and wherein the controller is configured to modulate the cutting energy by increasing the amount of time for which the cutting voltage is applied if the contact area exceeds an area threshold.

In some embodiments, the cutting energy parameter comprises a DC component of voltage across the tissue, and wherein the controller is configured to modulate the cutting energy by increasing the cutting voltage if the contact area exceeds an area threshold.

In some embodiments, the cutting energy parameter comprises a value of cutting voltage applied to the tissue, and wherein the controller is configured to modulate the cutting energy by increasing the value of cutting voltage if the contact area exceeds an area threshold.

In another aspect of the present disclosure, a medical device for treating a biological tissue includes a power source configured to generate high frequency electric power. An end effector is operably coupled to the power source and is configured to supply electrical energy to the tissue. A controller is operably coupled to the power source and the end-effector. The controller is configured to: (a) control the power source to modulate a first high frequency energy applied to the tissue for desiccating the tissue, (b) estimate a first parameter during (a), and (c) control the power source to modulate a cutting energy applied to the tissue for cutting the tissue based on the first parameter.

In some embodiments, the controller is further configured to: (d) control the power source to modulate a second high frequency energy applied to the tissue to coagulate the tissue cut in (c).

In some embodiments, the controller is further configured to perform (a)-(d) sequentially for a first cycle and repeating (a)-(d) sequentially for a second cycle for treating the tissue.

In some embodiments, the controller is further configured to modulate the cutting energy in the second cycle based on the first parameter estimated during the first cycle.

In some embodiments, the controller is further configured to estimate a second parameter during (d).

In some embodiments, the controller is further configured to modulate the cutting energy in the second cycle based on the first and second parameters estimated during the first cycle.

In some embodiments, the second parameter comprises high frequency power output during (d).

In some embodiments, the controller is further configured to repeat the second cycle, wherein modulating the cutting energy is based on the first and second parameters estimated during an immediately preceding second cycle.

In some embodiments, the controller is further configured to repeat the second cycle, wherein modulating the cutting energy is based on the second parameter estimated during an immediately preceding second cycle and on the first parameter estimated during the first cycle.

In some embodiments, the first parameter comprises a time for a DC component of voltage across the tissue during (a) to reach a first threshold value.

In some embodiments, the controller is further configured to modulate the cutting energy by estimating a contact area between the tissue and an end effector of the medical device based on the first parameter, and changing a cutting energy parameter associated with application of the cutting energy based on the contact area.

In some embodiments, the cutting energy parameter comprises an amount of time for which cutting voltage is applied to the tissue, and wherein the controller is configured to modulate the cutting energy by increasing the amount of time for which the cutting voltage is applied if the contact area exceeds an area threshold.

In some embodiments, the cutting energy parameter comprises a DC component of cutting voltage applied to the tissue, and wherein the controller is configured to modulate the cutting energy by increasing the cutting voltage if the contact area exceeds an area threshold.

In some embodiments, the cutting energy parameter comprises a value cutting voltage applied to the tissue, and wherein the controller is configured to modulate the cutting energy by increasing the value of cutting voltage if the contact area exceeds an area threshold.

Additional features and advantages will be set forth in the description that follows, and in part will be apparent from the description, or may be learned by practice of the invention. The objectives and other advantages of the disclosed input device will be realized and attained by the structure particularly pointed out in the written description and claims thereof as well as the appended drawings.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1:
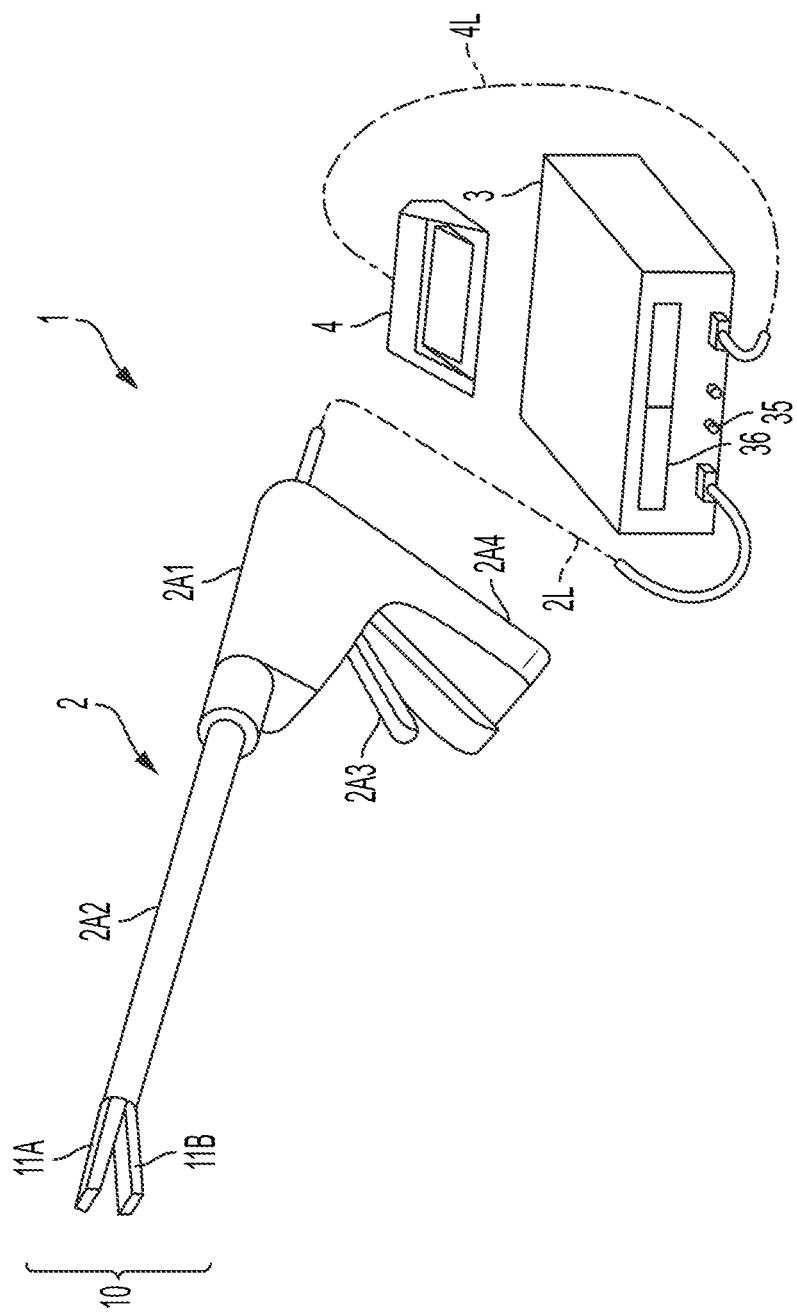
FIG. 1 shows a schematic of an example medical device for treating a tissue, in accordance with some embodiments.

Throughout all of the drawings, dimensions of respective constituent elements are appropriately adjusted for clarity, illustration, and convenience. For ease of viewing, in some instances only some of the named features in the figures are labeled with reference numerals.

DETAILED DESCRIPTION

During some electrosurgical procedures, a high frequency electric energy is applied to the biological tissue to cut the tissue. The electric current flowing across the tissue during this process results in localized heating of the tissue causing the tissue to desiccate and denature. In general, as the impedance of the tissue increases, the potential across the tissue increases, and when the potential across the tissue reaches a breakdown voltage (also referred to herein as a threshold voltage), an arc discharge is produced. When the arc discharge occurs, a DC voltage builds across the tissue being treated because of rectifying action. As the arc discharge occurs, the current flowing across the tissue through a path formed by the contact between the tissue and the end-effector being used to apply the electrical energy increases. Because the contact area between the tissue and the end-effector is typically small, the increased current produces large amount of heat in the small area, resulting in rupture of the cells surrounding the region of contact between the end-effector and the tissue. Thus, the tissue is cut using the arc discharge.

Once the arc discharge occurs and the tissue is cut, the electrical energy applied to the tissue is reduced to allow the cut tissue to coagulate, thereby stopping the bleeding from the cut tissue.

The contact area between the tissue and the end-effector depends on the shape and size of the end-effector (and the shape and size of the end-effector, typically, does not change during a procedure). Thus, the DC voltage across the tissue can be adjusted by adjusting the discharge intensity, which can in turn be adjusted by adjusting the power (i.e., the high frequency current and voltage) supplied to the end-effector. However, during the procedure the contact area between the tissue and the end-effector does not remain constant, and instead, depends on factors such as the exact shape of the end-effector and the angle at which the end-effector contacts the tissue. Thus, in order to determine the power to be supplied to the end-effector to effectuate an arc discharge, an accurate estimation of the contact area between the tissue and the end-effector was considered to be an important factor. Furthermore, parameters such as, for example, a rate of rise in the DC voltage across the tissue can serve as a proxy for estimating the contact area between the tissue and the end-effector.

Accordingly, a method for treating a biological tissue using high frequency electrical energy may include estimating a first parameter based on or during a first application high frequency electrical energy to the tissue. The first parameter can be used for estimating the contact area between the tissue and the end-effector during that particular procedure, which can then be used to estimate the power to be supplied to the end-effector to effectuate an arc discharge.

High frequency, as used herein, refers to a frequency in a range from about 200 kHz to about 5 MHz Thus, depending on the specific application, a device (such as a device for electrothermal cutting) may supply electrical energy to the tissue by applying a voltage at a frequency of, e.g., 200 kHz, 250 kHz, 300 kHz, 350 kHz, 400 kHz, 450 kHz, 500 kHz, 600 kHz, 700 kHz, 800 kHz, 900 kHz, 1000 kHz, 1500 kHz, 2000 kHz, 2500 kHz, 3000 kHz, 3500 kHz, 4000 kHz, 4500 kHz, 5000 kHz, or any frequency between any two of these frequencies.

In an aspect of the present disclosure, a system for cutting a tissue using high frequency electrical energy provided to a tissue is disclosed. The system may include a power source configured to generate high frequency electrical power and an end effector operably connected to the power source and configured to provide high frequency electrical energy to the tissue. The system further includes a controller operably connected to the power source and configured to control the power source and estimate one or more parameters while high frequency electrical energy is being applied to the tissue. The controller is configured to control the power source to modulate a first high frequency electrical energy applied to the tissue for desiccating the tissue and estimating a first parameter during the modulation of the first high frequency energy. The controller then controls the power source to modulate cutting energy applied to the tissue for cutting the tissue based on the first parameter. The first parameter may be, for example, a rate of increase of the DC voltage across the tissue while the tissue is desiccating. The first parameter may be used to estimate contact area between the tissue and the end-effector, which may then be used to estimate the power to be supplied to the end-effector to effectuate an arc discharge for cutting the tissue.

The term "patient," as used herein, comprises any and all organisms and includes the term "subject." A patient can be a human or an animal.

Medical Device for Heating Tissue

FIG. 1 shows a schematic of a medical device for heating a tissue, in accordance with an embodiment of the present disclosure. As shown in FIG. 1, the medical device 1 for cutting a tissue is provided with an instrument 2, a controller 3 having a processor, and an actuation switch 4. The instrument 2 may include, for example, a clamp used for grasping a biological tissue during an electrosurgical procedure.

The treatment instrument 2 has a grip 2A1, a shaft 2A2, and a treatment section constituted by an end-effector 10 such as, for example, an openable or pivoting pair of grasping sections (including a first grasping section 11A and a second grasping section 11B) for grasping living tissue (LT) to perform treatment. The grasping sections as a whole are also referred to herein as the "treatment portion" or the "treatment section" of the medical instrument. Note that, hereinafter, at time of mentioning each of the components having a same function and having reference numerals with A and B attached to ends of the reference numerals, respectively, the symbol A or B may be omitted. For example, each of the first grasping section 11A and the second grasping section 11B may be referred to as the grasping section.

The grip 2A1 is connected to the controller 3 via a cable 2L. The grip 2A1 has an opening/closing actuator 2A3, such as a trigger, for a surgeon to operate opening and closing of the treatment section in such a shape that the surgeon can easily clasp the tissue. The opening/closing actuator 2A3 is arranged at one end of the grip 2A1 and is integrated with the treatment section to transmit operation of the opening/closing actuator 2A3 to the treatment section. On the other side of the grip 2A1, a grasping portion 2A4 is provided for a clinician to grasp when operating the instrument 2.

Figure 2A:
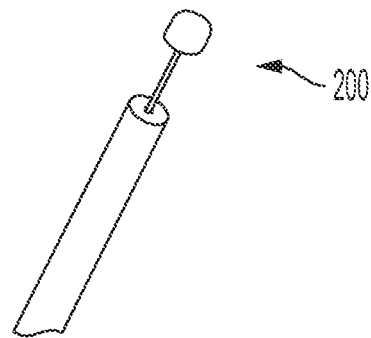
FIGS. 2A, 2B and 2C are examples of various end-effectors used for treating a biological tissue by applying high frequency electrical energy, in accordance with some embodiments.
Figure 2B:
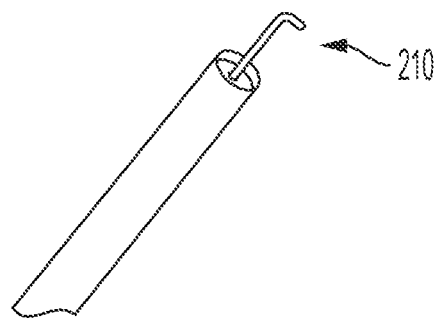
Figure 2C:
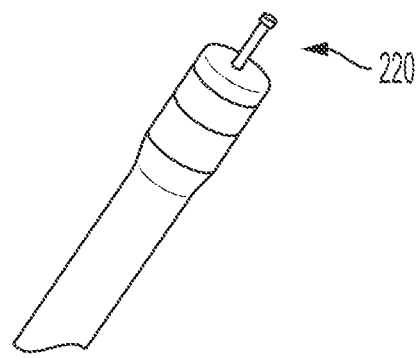

While FIG. 1 shows a tissue-grasping end-effector, depending on the type of procedure, end-effectors with other shapes and sizes may be used. FIGS. 2A, 2B and 2C illustrate some examples of end-effectors with different shapes and sizes. Each of these shapes and sizes has its advantages and are, therefore, more suitable for performing certain types of procedures. For example, the end-effector 200 shown in FIG. 2A has a larger contact area with the tissue and therefore, provides higher coagulability and higher hemostatic performance. Similarly, the end-effector 210 of FIG. 2B, having a hooked shape, is more suitable for excision of mucosa where the mucosa can be caught in the hook and separated from the submucosal layer. The end-effector 220 of FIG. 2C, with its sharp tip may be used more suitably for functions such as marking the tissue, mucosal incision, detachment, as well as for hemostasis.

Regardless of the exact shape of the end-effector, those skilled in the art will readily appreciate that the contact area between the tissue and the end-effectors shown in FIG. 1 as well as in FIGS. 2A-2C are different.

Figure 3:
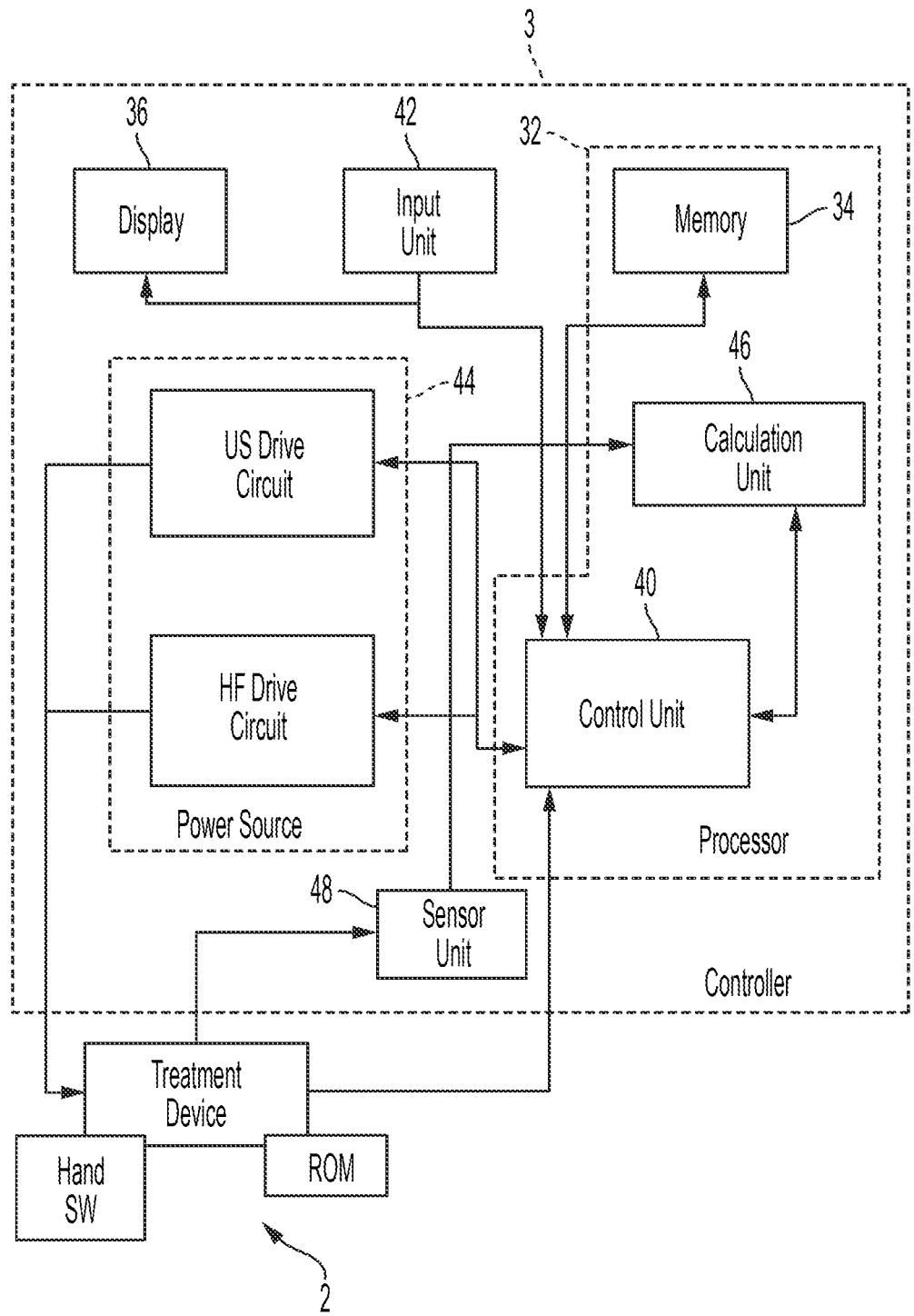
FIG. 3 shows a schematic of a controller in accordance with some embodiments.

FIG. 3 shows a schematic of a controller in accordance with an embodiment of the present disclosure. The controller 3 may include a processor 32, a display 36, an input unit 42, a sensor unit 48, and a power source 44.

The processor 32 may include a memory 34, a calculation unit 46 and a control unit 40. The calculation unit 46 and the control unit 40 are formed of an integrated circuit including a CPU (Central Processing Unit), an ASIC (Application Specific Integrated Circuit) or an FPGA (Field Programmable Gate Array). The calculation unit 46 and the control unit 40 may be formed of a single integrated circuit, or may be formed of a plurality of integrated circuits.

The control unit 40 is configured to control the power source 44 and the display 36 based on the commands provided by the processor 32 using the parameters computed by the calculation unit 46.

The display 36 that displays treatment conditions and the like, and a setting operation section 35 for the clinician or operator to set the treatment conditions and the like, are on a front panel of the controller 3. In some embodiments, the controller 3 may be connected to a switch 4 via a cable 4L, as illustrated in FIG. 1. The actuation switch 4 may be used by the clinician performing the procedure for controlling power applied to the instrument, for example, between cutting different portions of the tissue.

In some embodiments, various parameters used for determining the power to be supplied for cutting the tissue may be stored in memory 34, e.g., in a look-up table stored in the memory 34. The factors may include, but are not limited to, the size of the tissue, the type of the tissue, the impedance of the tissue, factors that determine the impedance of the tissue, the contact area between the tissue and the end-effector, the shape and size of the tissue, the shape and size of the end-effector, DC voltage across the tissue, and the like. The look-up table may include the values of the corresponding parameters for different treatment portions. For example, the look-up table may include the parameters for muscle tissue, adipose tissue, blood vessels, intestinal wall, or other tissue types. Also for example, the look-up table may include sized-based variations in parameters, such as the impedance (Z), rate of increase in impedance ($\dot{Z}$), and rate of increase in the DC voltage across the tissue. Such sized-based variations in parameters may be quantized based on predetermined small, medium, or large contact area, may be quantized based on predetermined size ranges of the end-effector, or may be on a continuum based on size of the end-effector.

The calculation unit 46 is configured to estimate a rate of increase in the DC voltage across the tissue before or during heating of the tissue, as well as other parameters that are needed for computing the contact area of between the tissue and the end-effector.

The sensor unit 48 is configured to determine a first parameter associated with the desiccation of the tissue. For example, the sensor unit 48 may be configured to determine a rate of increase in DC voltage across the tissue during the process of desiccation in some embodiments. Additionally or alternately, the sensor unit 48, in some embodiments, may be configured to determine an impedance (Z) or the rate of increase in the impedance ($\dot{Z}$) of the tissue during or after the desiccation process. In some embodiments, the first parameter may be a time for the DC voltage across the tissue during the process of desiccation to reach a first threshold value.

The sensor unit 48, in some embodiments, may be further configured to determine a second parameter associated with the coagulation of the tissue. For example, the sensor unit 48 may be configured to determine high frequency power output by a power source as a function of time or the total power output during the coagulation process.

In some embodiments, the calculation unit 46 is configured to determine a contact area between the tissue and the end-effector based on input received from the control unit 40 and/or the sensor unit 48. For example, in some embodiments, the calculation unit 46 may determine the contact area between the tissue and the end-effector based on a first parameter measured by the sensor unit 48. The contact area between the tissue and the end-effector may be estimated based on the first parameter using a mathematical formula or by using a look-up table, which may include pre-calculated values for contact areas for certain types of end-effectors and values of first parameter, either on a quantized-basis or a continuum-basis.

Figure 4:
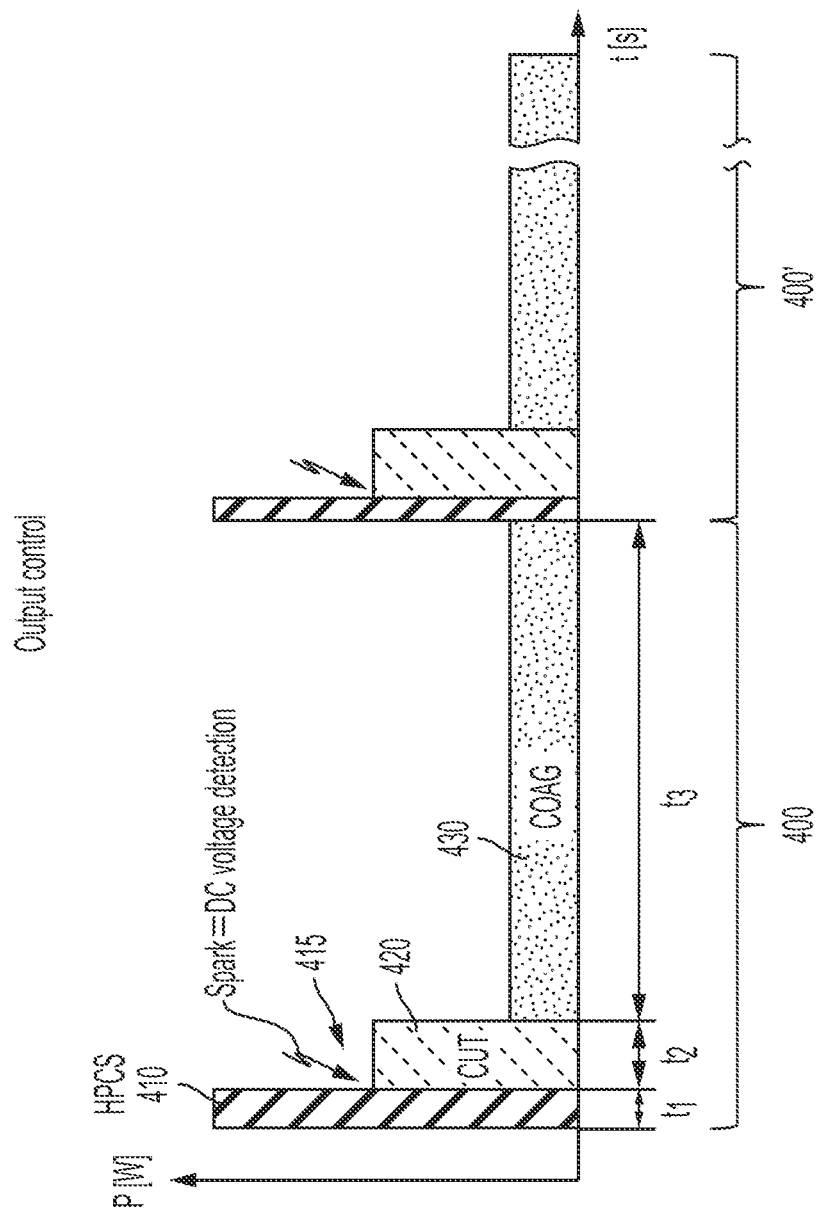
FIG. 4 illustrates a graph of power output to the tissue during a procedure for treating the tissue as a function of time (power (in watts) as a function of time (in seconds)), in accordance with embodiments.

FIG. 4 is a graph showing the power output to the end-effector by the power source as a function of time during the treatment of the biological tissue, in accordance with some embodiments. Such graph may be used for creating a look-up table for determining the first and second parameters associated with estimating the contact area between the tissue and the end-effector as well as other parameters associated with the treatment of the tissue.

As illustrated in FIG. 4, the treatment of the tissue includes a cycle 400 with three phases. In the first phase 410, also referred to as the high power cut support (HPCS) phase, the end-effector outputs a high power for a short amount ($t_1$) of time so as to desiccate the tissue. During this first phase 410, the impedance of the tissue rises. Moreover, the DC voltage across the tissue rises in proportion to the discharge. This rise is dependent on the contact area between the tissue and the end-effector.

Thus, the contact area between the tissue and the end-effector may be estimated based on the time taken for the DC voltage across the tissue to increase to a certain threshold in some embodiments. For example, if the time taken for the DC voltage across the tissue to increase to a first threshold is less than or equal to a first time threshold ($t_{r1}$), the contact area may be determined to be "small" or less than an area threshold. On the other hand, if the time taken for the DC voltage across the tissue to increase to the first threshold is greater than the first time threshold ($t_{r1}$), the contact area may be determined to be "large," or greater than an area threshold.

During the second phase 420, also referred to herein as the cut phase, power output to the end-effector is reduced slightly so as to effectuate an arc discharge 415 by increasing the current across the tissue. The second phase 420 is continued for a time $t_2$ determined based on the contact area between the tissue and the end-effector. Similarly, other parameters such as the voltage output to the end-effector is also determined based on the contact area between the tissue and the end-effector.

During the third phase 430, also referred to herein as the coagulation phase (or the COAG phase), the power output to the end-effector is further reduced so as to allow coagulation (or sealing) of the tissue cut during the cut phase. The COAG phase is typically the longest phase and is continued for a time $t_3$.

During a procedure for treating the biological tissue, the cycle 400 may be repeated several times depending on the size of the cut. As an example, FIG. 4 shows a second cycle 400' that follows the first cycle 400. However, procedures with various numbers of cycles can be used, such as up to 3 cycles, up to 5 cycles, up to 10 cycles, up to 20 cycles, or a larger number of cycles as long as the clinician/operator intends, e.g., by activating the actuation switch 4. Thus, the various parameters for modulating the high frequency power output to the end-effector in second and subsequent cycles may be determined based on the parameters determined in the previous cycles, and in particular determined in an immediately preceding cycle. For example, depending how the cut is performed, and the purpose of the cut being performed, the contact area between the tissue and the end-effector in a subsequent cycle may change. Thus, the estimates relating to the contact area from the previous cycle may not be accurate. Accordingly, any one or more of the time $t_1$ for the HPCS phase, the time $t_2$ for the cut phase, and the time $t_3$ for the COAG phase may vary from cycle to cycle.

For example, the time $t_1$ for the HPCS phase in a subsequent cycle may be determined based on the COAG phase of the immediately preceding cycle, which determines the initial contact area between the tissue and the end-effector and thus, the power needed to desiccate the tissue. Thus, in some embodiments, the power output to the end-effector in the HPCS phased of third and subsequent cycles may be determined based on the power output to the end-effector during the COAG phase of the immediately preceding cycle.

Also for example, after the second cycle, the output during the CUT period is determined according to the DC voltage threshold arrival time during the HPCS period of that cycle and the output during the COAG period of the immediately preceding cycle. When determined in this manner, the output for the CUT period for each cycle can be refined, even if the contact area between the treatment tool and the living tissue changes for each cycle.

Referring back to FIG. 3, in some embodiments, the controller 3 includes a processor 32, which determines the various parameters for controlling the application of power to the end-effector 10 via the power source 44. The controller 3 controls the power source 44 to appropriately modulate the electrical energy output to the end-effector 10 and thereby to the tissue during different phases of the treatment cycle such as the HPCS phase, the cutting phase and the COAG phase.

To control the power input to the end-effector 10, the processor 32 may determine the various parameters for controlling the power source 44 for modulating the power output to the end-effector 10. For example, the processor 32 can determine the contact area between the tissue and the end-effector, the power to be output to the end-effector during each of the three phases of the treatment cycle, the time for which each phase of the treatment cycle should be continued (e.g., the amount of time for which a cutting voltage is applied to the tissue), and the like. In some embodiments, these parameters can be determined based on the first and second parameters measured by the sensor unit 48. The first parameter may be, for example, a time taken for the DC voltage across the tissue to reach a certain threshold, or the rate of increase of the DC voltage during the HPCS phase of a given cycle. The second parameter may be, for example, the power output to the end-effector during all three phases of the treatment cycle and in particular during the COAG phase of the treatment cycle.

In some embodiments, the processor 32 controls the electrical energy supplied to the end-effector 10 by controlling the power output of the power source 44. Thus, the processor 32 may cause the power source 44 to increase or decrease the power output to the end-effector 10 as well as change the rate of the increase or decrease in the supplied power and the time for which the power is being supplied at different levels. Additionally, the processor 32 may cause the power source 44 to stop the power output to the end-effector 10.

For example, in some embodiments, before the start of the treatment procedure or in conjunction with the beginning of the treatment procedure, i.e., during the HPCS phase, the processor 32 may control the power source 44 to apply a constant power to a tissue for a time $t_1$. In some embodiments, $t_1$ may be for example, about 10 ms, about 20 ms, about 30 ms, about 40 ms, about 50 ms, about 60 ms, about 70 ms, about 80 ms, about 90 ms, about 100 ms, about 120 ms, about 140 ms, about 160 ms, about 180 ms, about 200 ms, about 250 ms, about 300 ms, about 400 ms, or any other amount of time between any two of these values. The sensor unit 48 may measure the DC voltage during the HPCS phase. The processor 32 may then determine a rate of increase in the DC voltage as well as time taken for the DC voltage to reach a voltage threshold.

The processor may then control the power source to modulate the electrical energy supplied to the tissue during the cutting phase based on the rate of increase in the DC voltage as well as time taken for the DC voltage to reach the voltage threshold. The electrical energy supplied to the tissue may be modulated by changing a cutting energy parameter associated with the application of the cutting energy. The cutting energy parameter may be, for example, the power output to the end-effector, an amount of time for which cutting voltage is applied to the tissue, or the DC voltage across the tissue. The electrical energy supplied to the tissue may, thus, be modulated by controlling the amount of time for which the power is output to the end-effector (i.e., applied to the tissue), or allowing the DC voltage across the tissue to increase to a cutting voltage value.

For example, if the amount of time taken for the DC voltage to reach the voltage threshold is greater than or equal to a first time threshold, the contact area is determined to be greater than an area threshold. If the contact area is determined to exceed the area threshold, the processor 32 may control the power source 44 to increase the amount of time for which the cutting phase is continued. Alternately or additionally, the processor 32 may control the power source 44 to increase the power output the end-effector 10. Similarly, in some embodiments, the processor 32 may control the power source 44 to continue outputting power to the end-effector 10 until the DC voltage across the tissue has increased above a cutting voltage threshold.

In some embodiments, the amount of time for which power is output to the end-effector 10 during the cutting phase may be about 1 ms, about 2 ms, about 3 ms, about 4 ms, about 5 ms, about 6 ms, about 7 ms, about 8 ms, about 9 ms, about 10 ms, about 11 ms, about 12 ms, about 13 ms, about 14 ms, about 15 ms, about 16 ms, about 17 ms, about 18 ms, about 19 ms, about 20 ms, about 22 ms, about 24 ms, about 26 ms, about 28 ms, about 30 ms, about 35 ms, about 40 ms, about 50 ms, about 55 ms, about 60 ms, about 65 ms, about 70 ms, about 80 ms, about 90 ms, about 100 ms, about 120 ms, about 140 ms, about 160 ms, about 180 ms, about 200 ms, or any amount of time between any two of these values.

Once the tissue is cut, the processor may further control the power source to transition the cycle to the COAG phase. For example, the processor 32 may cause the power source 44 to reduce the power output to end-effector 10 to a predetermined value so as to allow the cut tissue to coagulate, thereby stopping the bleeding from the cut tissue. The processor 32 may further determine the amount of time for which to continue the COAG phase depending on various parameters such as, for example, the size of the cut tissue. The size of the cut tissue can, typically, be determined based on the contact area between the tissue and the end-effector. Thus, the processor 32 may determine the amount of time for which to continue the COAG phase based on the rate of increase in the DC voltage as well as time taken for the DC voltage to reach the voltage threshold in some embodiments. Additionally or alternately, the processor 32 may determine the amount of time for which to continue the COAG phase based on the amount of time for the cutting phase as well as the power output to the end-effector 10 during the cutting phase.

In some embodiments, the amount of time for which power is output to the end-effector 10 during the COAG phase may be 10 ms, about 20 ms, about 30 ms, about 40 ms, about 50 ms, about 60 ms, about 70 ms, about 80 ms, about 90 ms, about 100 ms, about 120 ms, about 140 ms, about 160 ms, about 180 ms, about 200 ms, about 250 ms, about 300 ms, about 400 ms, about 500 ms, about 600 ms, about 700 ms, about 800 ms, about 900 ms, about 1000 ms, about 1100 ms, about 1200 ms, about 1300 ms, about 1400 ms, about 1500 ms, about 1600 ms, about 1700 ms, about 1800 ms, about 1900 ms, about 2000 ms, about 2200 ms, about 2400 ms, about 2600 ms, about 2800 ms, about 3000 ms, about 3500 ms, about 4000 ms, about 5000 ms, or any other amount of time between any two of these values.

Figure 5:
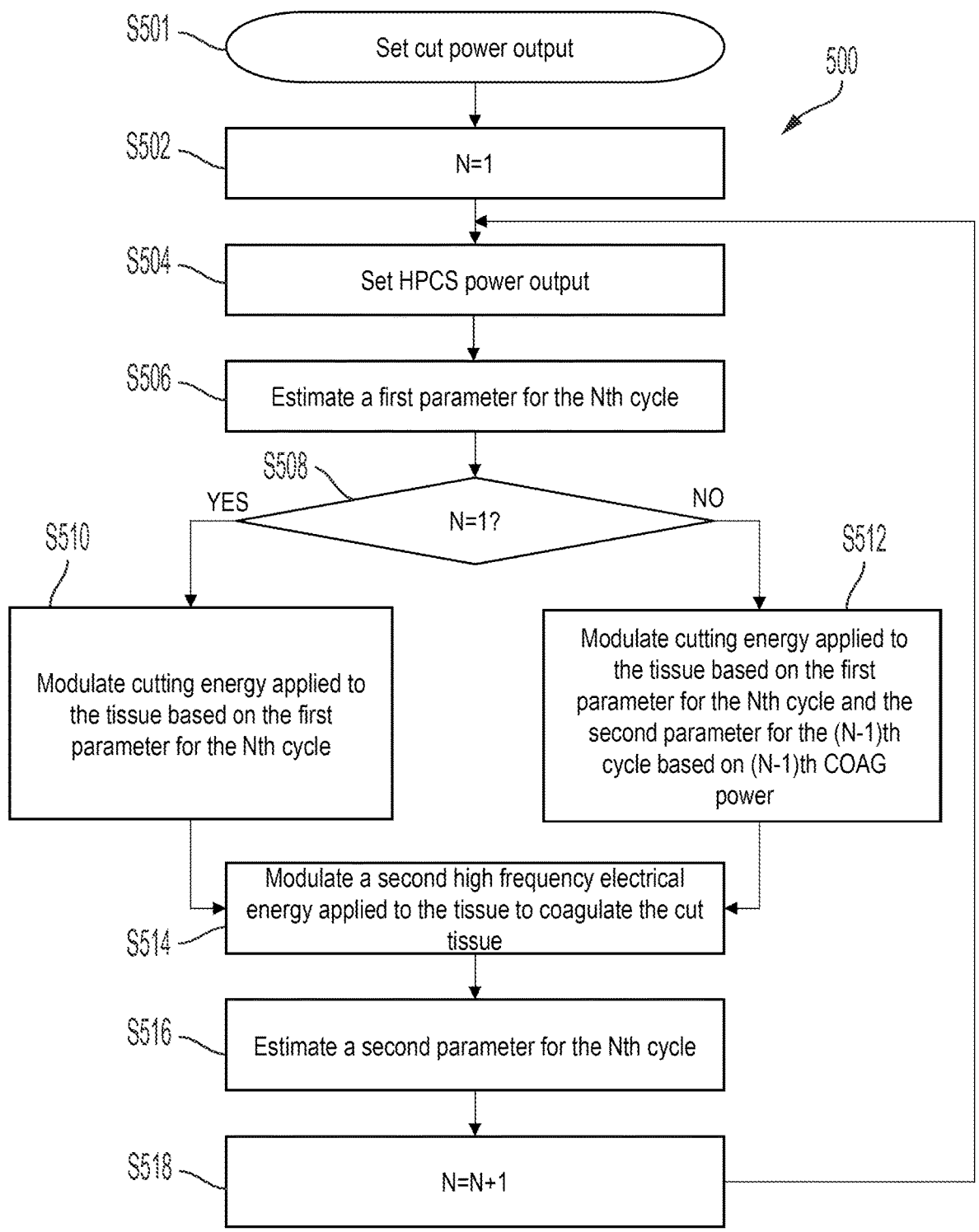
FIG. 5 is a flow chart for an example method of treating a biological tissue, in accordance with some embodiments.

In another aspect, the present disclosure relates to a method for treating a biological tissue using a medical device configured to treat the tissue using high frequency electrical energy. FIG. 5 illustrates a flow chart for a method of treating a biological tissue in accordance with some embodiments.

The method 500 may include, at S501, setting an initial cut power output. At S502, the cycle number N is set to 1. At S504, a power output for the HPCS phase is set. S504 corresponds to the HPCS phase (i.e., first phase 410, see FIG. 4) of the cycle for the treatment procedure. As discussed herein, setting the high frequency electrical energy applied to the tissue may be performed by, for example, controlling the power output to the end-effector, controlling the amount of time for which the power is output to the end-effector as well as allowing a DC voltage across the tissue to reach a certain voltage threshold.

Without wishing to be bound by theory, a sharp rise in the potential across the tissue may result in a rapid arc discharge (i.e., 415, see FIG. 4) during the HPCS phase when the tissue is not completely desiccated. A rapid arc may not produce a desirable cut or may result in excessive bleeding because the tissue has not desiccated completely. Thus, in some embodiments, setting the high frequency electrical energy applied to the tissue may be performed by controlling the rate of increase in the DC voltage across the tissue by, for example, controlling the rate of increase in current across the tissue during the HPCS phase. The current across the tissue may be increased over a period of over about 2 ms, about 4 ms, about 6 ms, about 8 ms, about 10 ms, 12 ms, about 14 ms, about 16 ms, about 18 ms, about 20 ms, about 25 ms, about 30 ms, about 35 ms, about 40 ms, about 45 ms, about 50 ms, or any other period of time between any two of these values.

At S506, a first parameter for the Nth cycle is estimated. In some embodiments, the first parameter may be time for a DC voltage across the tissue to reach a first threshold value during the HPCS phase. For example, a time for the DC voltage across the tissue to reach the first threshold value during the HPCS phase that is below the threshold time is indicative of a small contact area between the treatment tool and the living tissue; a time for the DC voltage across the tissue to reach the first threshold value during the HPCS phase that is above the threshold time is indicative of a large contact area between the treatment tool and the living tissue. Examples of the HPCS current ($I_{HF}$) and corresponding behavior of DC voltage ($V_{DC}$) for a small contact area and a large contact area are given in the graphs in FIG. 6A.

In some embodiments, the first parameter may be a rate of increase of the potential across the tissue in the HPCS phase.

For example, a rate of increase of the potential across the tissue to reach the first threshold value during the HPCS phase that is below a threshold rate is indicative of a large contact area between the treatment tool and the living tissue; a rate of increase of the DC component of voltage across the tissue to reach the first threshold value during the HPCS phase that is above the threshold rate is indicative of a small contact area between the treatment tool and the living tissue. Furthermore, by having a smaller rate of increase of HPCS current, e.g., the increase in HPCS current ($I_{HF}$) is increased to equal to or greater than 10 ms, the corresponding changes in the DC voltage ($V_{DC}$) resulting from the discharge can be more easily detected, particularly for small changes. Examples of the HPCS current and corresponding behavior of DC voltage for a small contact area and a large contact area are given in the graphs in FIG. 6B.

Subsequently, the high frequency electrical energy applied to the tissue is modulated so as to cut the tissue. This phase corresponds to the cutting phase of the cycle, and thus, the high frequency electrical energy applied to the tissue during this cycle (i.e., second phase 420, see FIG. 4) is also referred to as cutting energy. The modulation of the cutting energy is performed based on the first parameter for the Nth cycle and, for cycles after N=1, the second parameter for the (N−1)th cycle based on the power applied to coagulate the tissue following the cutting.

It must be noted that for the first cycle, the second parameter of the previous cycle does not exist, and thus, at S508, it is determined whether N=1. If N=1, at S510, the cutting energy is modulated based on the first parameter for the Nth cycle (i.e., the first cycle), so as to cut the tissue. On the other hand, if N is not equal to one (i.e., greater than one), at S512, the cutting energy is modulated based on the first parameter for the Nth cycle and the second parameter for the (N−1)th cycle based on the power applied to coagulate the tissue.

Modulation of the cutting energy may include, but is not limited to, changing one or more of voltage applied to the tissue during the cutting phase, power output to the end-effector during the cutting phase, amount of time for which power is output to the end-effector during the cutting phase, DC the voltage across the tissue, a rate of increase in the DC voltage across the tissue, and the like. Thus, in some embodiments, the amount of time for which power is output to the end-effector may be changed based on the first parameter for the Nth cycle and the second parameter for the (N−1)th cycle. For example, if the first parameter is less than or equal to a first threshold value, the cutting energy is modulated by outputting power to the end-effector for a first time threshold. If the first parameter is greater than the first threshold value, the cutting energy is modulated by increasing the time for which power is output to the end-effector to a second time threshold.

As discussed herein modulating cutting energy may also include determining a contact area between the tissue and the end-effector based on the first parameter and changing the cutting energy parameter based on the contact area between the tissue and the end-effector. Because the contact area between the tissue and the end-effector is typically dependent on the shape and size of the end-effector, which are typically known in advance, the cutting energy parameters corresponding to various end-effector shapes and sizes may be stored in a memory, e.g., in a look-up table. Thus, after the contact area between the tissue and the end-effector is determined based on the first parameter, the cutting energy parameters may be determine from the memory.

S514 corresponds to the coagulation phase, during which a second high frequency electrical energy applied to the tissue cut in the cutting phase is modulated so as to coagulate the tissue. The coagulation phase is performed so as to seal the blood vessels exposed because of the cut in the tissue by coagulating the cut tissue. During the coagulation phase, modulating the second high frequency electrical energy may include, but is not limited to, changing the power output to the end-effector, changing the amount of time for which the power is output to the end-effector, and the like.

Without wishing to be bound by theory, a larger tissue would require longer time to coagulate. Thus, in some embodiments, modulating the second high frequency electrical energy may include changing the amount of time for which power is output to the end-effector based on the contact area between the tissue and the end-effector, e.g., as determined during S508.

Moreover, power output to the end-effector for coagulating the tissue is greater if the size of the cut tissue is greater. Thus, power output to the end-effector during the coagulation phase is an indicator for the size of the cut tissue, and may therefore, be used to determine the parameters for the electrical energy applied for desiccating the tissue in a subsequent cycle. Thus, at S516, a second parameter, e.g., power output to the end-effector during the coagulation phase for the Nth cycle is determined. As discussed herein, the second parameter is indicative of the size of the tissue to be desiccated during the third and subsequent cycles, and is therefore, used to determine the power to be output to the end-effector during the HPCS phase as well as other parameters associated with modulating the first high frequency electrical energy.

At S518, the cycle number is increased by 1. The method then returns to S504 to continue and to repeat the cycles.

Figure 6A:
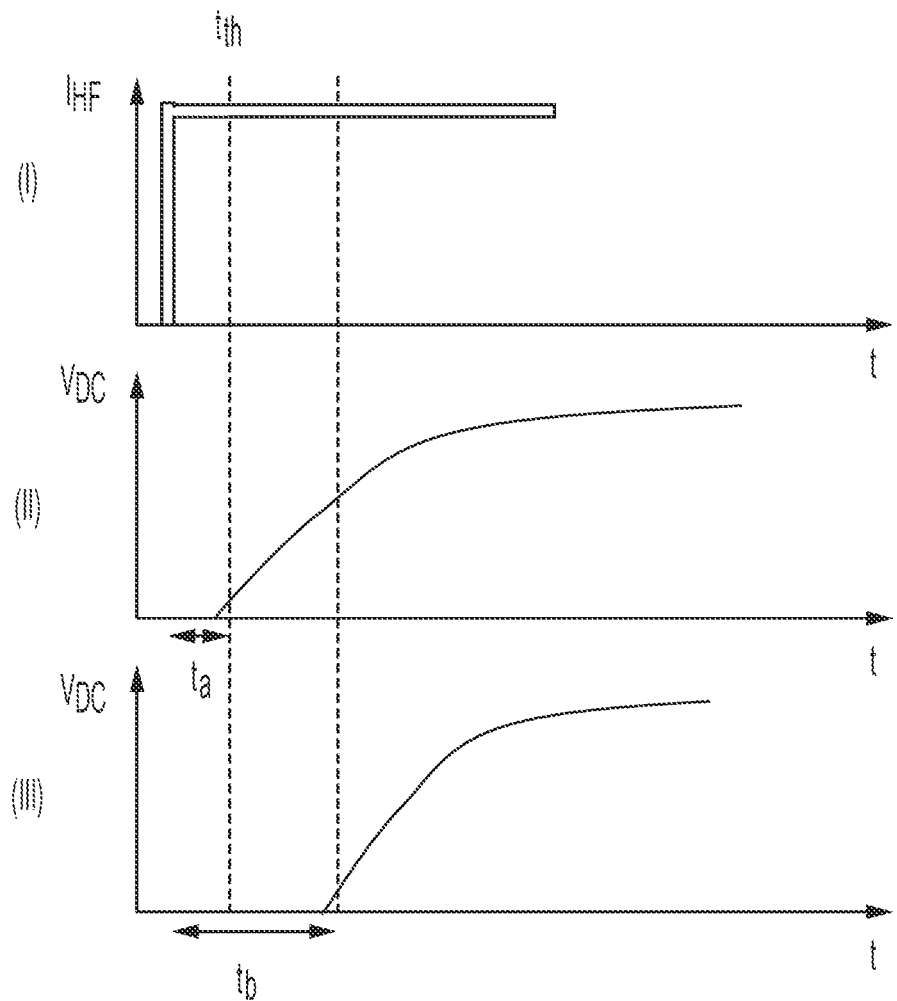
FIGS. 6A and 6B are graphs showing the HPCS current (Graph (I)) and corresponding behavior of DC voltage (Graphs (II) and (III)) as a function of time for the disclosed procedure applied to small contact area instance (Graph (II)) and a large contact area instance (Graph (III)).
Figure 6B:
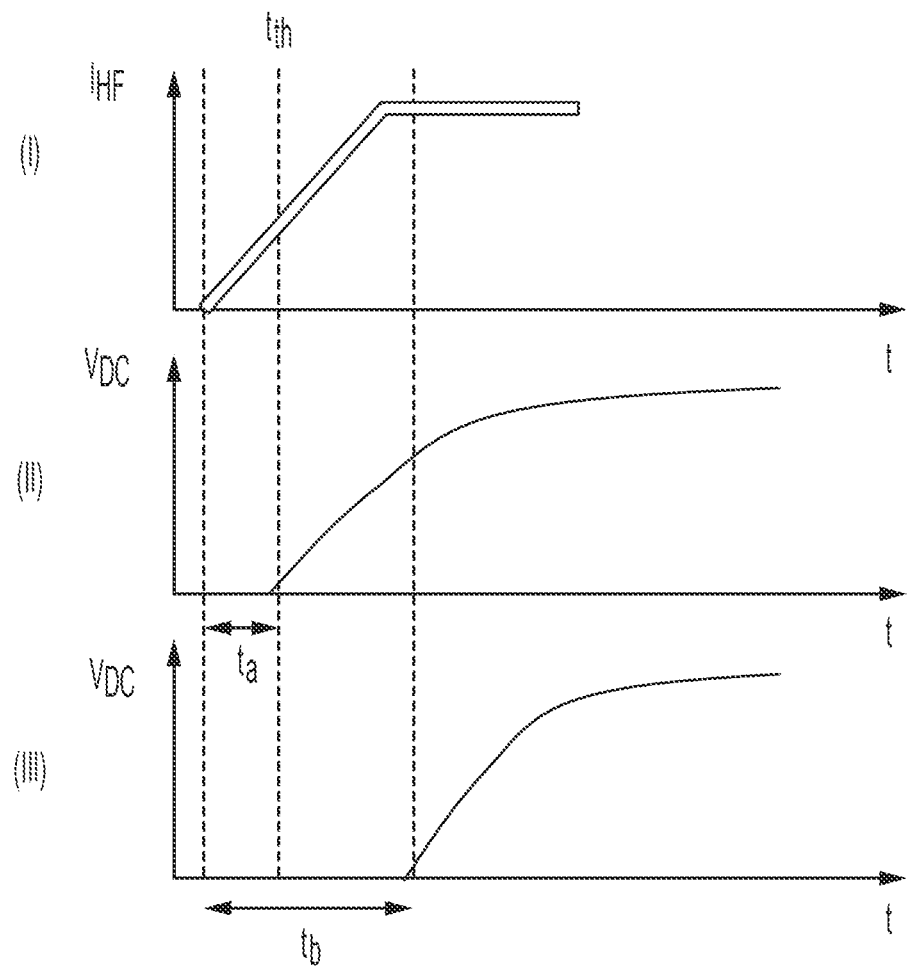

FIGS. 6A and 6B are graphs showing the HPCS current (Graph (I)) and corresponding behavior of DC voltage (Graphs (II) and (III)) as a function of time for the disclosed procedure applied to a small contact area instance (Graphs (II)) and a large contact area instance (Graphs (III)). The graphs in FIG. 6A demonstrate that the contact area between the treatment tool and the tissue can be determined by the time ($t_{th}$) it takes for the DC voltage ($V_{DC}$) to reach a threshold voltage during the application of HPCS current ($I_{HF}$). In the illustrated examples, a small contact area has a time to threshold ($t_a$) that is less than the threshold time ($t_{th}$) (see Graphs (II)), while a large contact area has a time to threshold ($t_b$) that is greater than the threshold time ($t_{th}$) (see Graphs (III)). The output characteristics of the CUT are determined according to the contact area. Also, in the small contact area examples (see Graphs (II)), the CUT output time is short, the output voltage is small, and the DC voltage ($V_{DC}$) is small, while in the large contact area examples (see Graphs (III)), the CUT output time is long, the output voltage is large, and the DC voltage ($V_{DC}$) is large.

The graphs in FIG. 6B demonstrate that by increasing the time period over which the HPCS current ($I_{HF}$) increases, e.g., increasing the time period to equal to or greater than 10 ms, it is easier to detect when and at what time ($t_{th}$) the DC voltage ($V_{DC}$) reaches a threshold voltage during the application of HPCS current ($I_{HF}$). In the illustrated examples in FIGS. 6A and 6B, a small contact area has a time to threshold ($t_a$) that is less than the threshold time ($t_{th}$) (see Graphs (II)), while a large contact area has a time to threshold ($t_b$) that is greater than the threshold time ($t_{th}$) (see Graphs (III)). The output characteristics during the CUT phase 420 of the cycle are determined according to the contact area.

The system and method disclosed herein improve the efficiency and reliability of the electrosurgical procedure used for treating a biological tissue using high frequency electrical energy. The system and method disclosed herein further reduce the incidence of spontaneous arc discharge during cutting of the tissue when the tissue is not completely desiccated, and thus, prevent excessive bleeding caused by cutting of partially desiccated tissue. In addition, by controlling the energy input to the tissue based on the size of the tissue during the tissue cutting process, the system and method disclosed herein improves the speed and efficiency of the process of cutting the tissue.

Although the present invention has been described in connection with the above exemplary embodiments, it will be appreciated by those skilled in the art that additions, deletions, modifications, and substitutions not specifically described may be made without department from the spirit and scope of the invention as defined in the appended claims.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

In some embodiments, any of the clauses herein may depend from any one of the independent clauses or any one of the dependent clauses. In one aspect, any of the clauses (e.g., dependent or independent clauses) may be combined with any other one or more clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

The singular forms "a," "an," and "the" include plural referents unless the context clearly dictates otherwise. Thus, for example, reference to "a plunger component" includes reference to one or more plunger components, and reference to "the magnet" includes reference to one or more magnets.

In one or more aspects, the terms "about," "substantially," and "approximately" may provide an industry-accepted tolerance for their corresponding terms and/or relativity between items, such as from less than one percent to five percent.

As used herein, the term "substantially" refers to the complete or nearly complete extent or degree of an action, characteristic, property, state, structure, item, or result.

It is to be understood that a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.5 to 10 cm" should be interpreted to include not only the explicitly recited values of about 0.5 cm to about 10.0 cm, but also include individual values and sub-ranges within the indicated range. Thus, included in this numerical range are individual values such as 2, 5, and 7, and sub-ranges such as from 2 to 8, 4 to 6, etc. This same principle applies to ranges reciting only one numerical value. Furthermore, such an interpretation should apply regardless of the breadth of the range or the characteristics being described.

Unless otherwise defined, all technical and scientific terms used herein have the same meaning as commonly understood to one of ordinary skill in the art to which this disclosure belongs. Although any methods, devices and materials similar or equivalent to those described herein can be used in the practice or testing of the disclosure, representative methods, devices, and materials are described below.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Many modifications may be made to this configuration without departing from the scope or spirit of the claimed subject matter.

Although the detailed description contains many specifics, these should not be construed as limiting the scope of the subject technology but merely as illustrating different examples and aspects of the subject technology. It should be appreciated that the scope of the subject technology includes some embodiments not discussed in detail above. Various other modifications, changes and variations may be made in the arrangement, operation and details of the method and apparatus of the subject technology disclosed herein without departing from the scope of the present disclosure. Unless otherwise expressed, reference to an element in the singular is not intended to mean "one and only one" unless explicitly stated, but rather is meant to mean "one or more." In addition, it is not necessary for a device or method to address every problem that is solvable (or possess every advantage that is achievable) by different embodiments of the disclosure in order to be encompassed within the scope of the disclosure. The use herein of "can" and derivatives thereof shall be understood in the sense of "possibly" or "optionally" as opposed to an affirmative capability.

What is claimed is:

1. A method for treating a tissue, the method comprising:
   (a) modulating a first high frequency electrical energy applied to the tissue;
   (b) estimating a first parameter associated with application of the first high frequency electrical energy to the tissue during (a); and
   (c) modulating a cutting energy applied to the tissue based on the first parameter,
   wherein the first parameter includes a rate of increase of voltage across the tissue during (a), and
   wherein modulating the cutting energy comprises estimating a contact area between the tissue and an end effector of the medical device based on the first parameter, and changing a cutting energy parameter associated with application of the cutting energy on the contact area.

2. The method of claim 1, further comprising: (d) modulating a second high frequency electrical energy applied to the tissue in (c) to coagulate the tissue.

3. The method of claim 2, further comprising performing (a)-(d) sequentially for a first cycle and repeating (a)-(d) sequentially for a second cycle.

4. The method of claim 3, wherein the first parameter comprises a time for a DC voltage across the tissue during (a) to reach a first threshold value.

5. The method of claim 3, further comprising estimating a second parameter during (d), wherein modulating the cutting energy in the second cycle is based on the second parameter estimated during the first cycle and the first parameter estimated during the second cycle.

6. The method of claim 5, wherein the second parameter comprises a high frequency power output during (d).

7. The method of claim 5, further comprising repeating the second cycle, wherein modulating the cutting energy during the repeated second cycle is based on the second parameter estimated during a completed second cycle and the first parameter estimated during the repeated second cycle.

8. The method of claim 1, wherein the cutting energy parameter comprises an amount of time for which a cutting voltage is applied to the tissue, and wherein modulating the cutting energy comprises increasing the amount of time for which the cutting voltage is applied if the contact area exceeds an area threshold.

9. The method of claim 1, wherein the cutting energy parameter comprises a DC voltage across the tissue, and wherein modulating the cutting energy comprises increasing the cutting voltage if the contact area exceeds an area threshold.

10. A controller for a medical device configured to:
    (a) control a power source to modulate a first high frequency energy applied to a tissue;
    (b) estimate a first parameter during (a); and
    (c) control the power source to modulate a cutting energy applied to the tissue based on the first parameter,
    wherein the first parameter includes a rate of increase of voltage across the tissue during (a),
    wherein the first parameter comprises a time for a DC voltage across the tissue during (a) to reach a first threshold value, and
    wherein the controller is configured to modulate the cutting energy by estimating a contact area between the tissue and an end effector of the medical device based on the first parameter, and changing a cutting energy parameter associated with application of the cutting energy based on the contact area.

11. The controller of claim 10, further configured to: (d) control the power source to modulate a second high frequency energy applied to the tissue in (c) to coagulate the tissue.

12. The controller of claim 11, further configured to perform (a)-(d) sequentially for a first cycle and repeating (a)-(d) sequentially for a second cycle.

13. The controller of claim 12, further configured to estimate a second parameter during (d), wherein the controller is configured to modulate the cutting energy in the second cycle based on the second parameter estimated during the first cycle and the first parameter estimated during the second cycle.

14. The controller of claim 13, wherein the second parameter comprises a high frequency power output during (d).

15. The controller of claim 13, further configured to repeat the second cycle, wherein modulating the cutting energy during the repeated second cycle is based on the second parameter estimated during a completed second cycle and the first parameter estimated during the repeated second cycle.

16. The controller of claim 10, wherein the cutting energy parameter comprises an amount of time for which a cutting voltage is applied to the tissue, and wherein the controller is configured to modulate the cutting energy by increasing the amount of time for which the cutting voltage is applied if the contact area exceeds an area threshold.

17. The controller of claim 10, wherein the cutting energy parameter comprises a DC voltage applied to the tissue, and wherein the controller is configured to modulate the cutting energy by increasing the cutting voltage if the contact area exceeds an area threshold.

18. A controller for a medical device configured to treat a tissue, the controller being operably coupled to a power source of the medical device and configured to:
- (a) control the power source to modulate a first high frequency energy applied to the tissue;
- (b) estimate a first parameter during (a);
- (c) control the power source to modulate a cutting energy applied to the tissue based on the first parameter; and
- (d) control the power source to modulate a second high frequency energy applied to the tissue in (c) to coagulate the tissue, wherein the controller is further configured to:
- perform (a)-(d) sequentially for a first cycle and, after the first cycle, repeat (a)-(d) sequentially for a second cycle, and
- estimate a second parameter during (d), and wherein the controller is configured to modulate the cutting energy in the second cycle based on the second parameter estimated during the first cycle and the first parameter estimated during the second cycle.

\* \* \* \* \*